United States Patent [19]
Nippe

[11] Patent Number: 4,590,108
[45] Date of Patent: May 20, 1986

[54] METHOD AND SYSTEM FOR INSULATING PIPES

[76] Inventor: Reynold B. Nippe, 6 William Fairfield Dr., Wenham, Mass. 01984

[21] Appl. No.: 629,624

[22] Filed: Jul. 11, 1984

[51] Int. Cl.⁴ ............ F16L 9/14

[52] U.S. Cl. ............ 428/36; 428/346; 428/351; 138/149; 138/150

[58] Field of Search ............ 138/149, 150; 428/346, 428/351, 36

[56] References Cited

U.S. PATENT DOCUMENTS

| | | | |
|---|---|---|---|
| 2,047,778 | 7/1936 | Hayden | 138/149 |
| 2,713,551 | 7/1955 | Kennedy | 138/150 |
| 2,937,665 | 5/1960 | Kennedy | 138/150 |
| 3,269,422 | 8/1966 | Mathews et al. | 138/149 |
| 3,522,413 | 8/1970 | Chrow | 138/149 |
| 3,642,034 | 2/1972 | Ullman et al. | 138/150 |
| 3,941,159 | 3/1976 | Toll | 138/149 |
| 4,307,756 | 12/1981 | Voight et al. | 138/149 |

*Primary Examiner*—John E. Kittle
*Assistant Examiner*—James J. Seidleck
*Attorney, Agent, or Firm*—Edward A. Gordon

[57] ABSTRACT

An insulating system for fluid conduit pipes and the method of insulating is disclosed. An inner layer of resilient flexible insulating material is wrapped about the outer surface of the conduit pipe. An outer layer of flexible cohesive material which is moisture and vapor impervious is wrapped about the inner layer of insulating material. The cohesive material is wrapped so that portions of adjacent edges overlap to self seal by forming a cohesive seal therebetween. Preferably the wrapping of the outer cohesive material is conducted so as to partially compress the inner resilient insulating layer both circumferentially and radically. The resiliency of the insulating material presses against the cohesive seal and thereby maximizes the cohesive seal and cooperates in holding the insulating system about the conduit pipe. The inner insulating layer and outer cohesive moisture and vapor barrier layer can be easily and concurrently applied by a single operator. The insulating system so produced can include a heat tracer element disposed about the conduit pipe and a heat reflective material disposed on the inner surface of the insulating material to abut the heat tracer element and/or the conduit pipe.

4 Claims, 7 Drawing Figures

10
2
38
38
20
28
12
22
2
16
14
18
30
32
24

METHOD AND SYSTEM FOR INSULATING PIPES

FIELD OF THE INVENTION

The present invention relates to a method and system for insulating pipes and more particularly to a flexible insulating system having thermal and vapor barriers and to the method of applying such insulating system.

BACKGROUND OF THE INVENTION

The art of pipe insulating and methods of applying the same are manifold. Exemplary of such art are U.S. Pat. Nos. 4,023,589 to Rejeski; 3,992,237 to Gerholt et al; 3,955,601 to Plummer III; 3,941,159 to Toll; 3,849,240 to Mikulak; and 3,613,737 to Schoeming. It is also known to insulate pipes with a layer of insulation material such as fiberglass and thereafter wrap the fiberglass with an outer layer of plastic material. This known method and materials requires the applicator to first apply the fiberglass wrap in sections and to tie or apply adhesive tape at the beginning and end of a section and at intervals along the length of the wrap. The application of plastic wrap material requires wraping in sections and the application of adhesive tapes or sealants well known to those skilled in the art to the seam in an effort to provide a tight seal. Such prior art methods and materials require additional time and materials to tie the insulation to the pipe and to apply tape and/or sealant material to the seams of the plastic wrap to keep moisture out. Such prior art applications require much more time and effort and at times involve an awkward and/or messy operation.

Accordingly, it is a desirable object of the present invention to provide a method and system for insulating pipes which overcomes the problems of the prior art.

Another desirable object of the present invention is to provide a method of insulating pipes which reduces time and materials and which permits rapid installation.

Another desirable object of the present invention is to provide a system for insulating pipes which is formed of flexible materials and which includes an inner thermal barrier and an outer vapor barrier. The outer vapor barrier material provides a self seal during application which holds the system in place about the pipe without the need for separate adhesives or sealants.

A still further desirable object of the present invention is to provide a pipe insulation system adapted to be easily applied about a pipe conduit embraced by a heat tracer member.

Another desirable object of the invention is to provide a pipe insulation system which provides means for identification of different pipeline services or functions.

The above and other desired objects, apparent from the drawing and following description, may be attained by the apparatus, construction, arrangements and combinations, subcombinations and parts which comprise the present invention, preferred embodiments of which are illustrative of the mode in which applicant has contemplated applying the principal, being set forth in detail in the following description and illustrated in the accompanying drawings.

SUMMARY OF THE INVENTION

The present invention discloses a method and system for insulating pipes and conduits and is principally directed to the provision of an insulating system which is easily and quickly applied, and one which is readily adapted by virtue of its inherent flexibility to use in situations where irregular forms are to be insulated.

The insulating system is applied as a one man operation and requires no special skill or training which effects substantial reduction in labor costs.

The materials of the insulating system provide for an inner thermal barrier and an outer vapor barrier and requires no adhesive, tapes or banding. The outer vapor barrier material may be provided with indicia, such as various colors to permit ready identification of different pipe services.

The inner heat insulating layer is formed of a flexible material which is preferably sufficiently resilient to extend radial and circumferential compressive forces outwardly as expansive forces upon the outer vapor barrier material when compressed by the outer vapor barrier material preferably during application.

The outer vapor barrier material is formed of a material which is flexible and substantially imperforate to serve as a barrier to fluids such as water vapor or other gases attempting to pass through it. A feature of the outer vapor barrier from which the invention appears to derive in part its substantial effectiveness is that it is formed of a material which is cohesive. The cohesive quality of the vapor barrier material serves to form a releasible seal when wrapped upon itself, for example. In accordance with this feature of the invention a layer of the thermal barrier material may be wrapped about the conduit to be protected and a layer of such cohesive vapor barrier material wrapped about the thermal barrier material in a manner whereby adjacent edges are overlapped to form a sealed area. The pressure exerted in the application of the cohesive outer vapor barrier material serves to contain and partially compress the insulating layer while forming a cohesive and/or mechanical seal between the areas of the overlapped edges of the vapor barrier material. The partial compression of the resilient thermal insulating layer provides sufficient resultant expansive forces which act outwardly radially and circumferentially against area defined by the overlapped edges of the vapor barrier material to cooperate in holding the overlapped edges in their cohesively sealed engagement. In accordance with this feature of the invention the material which forms the outer vapor barrier layer serves to hold itself as well as the inner layer of thermal insulating material in place about the conduit while providing a barrier to fluids such as water vapor or other gases. The thermal barrier material as well as the vapor barrier material are preferably in the form of sheets or ribbon material which can be dispensed from rolls of the material.

BRIEF DESCRIPTION OF THE DRAWING

For a fuller understanding of the nature and desired objects of the invention, reference should be made to the following detailed description taken in connection with the accompanying drawing wherein like reference characters refer to corresponding parts throughout the several views of the preferred embodiments of the invention and wherein.

DETAILED DESCRIPTION OF PREFERRED EMBODIMENTS

Figure 1:
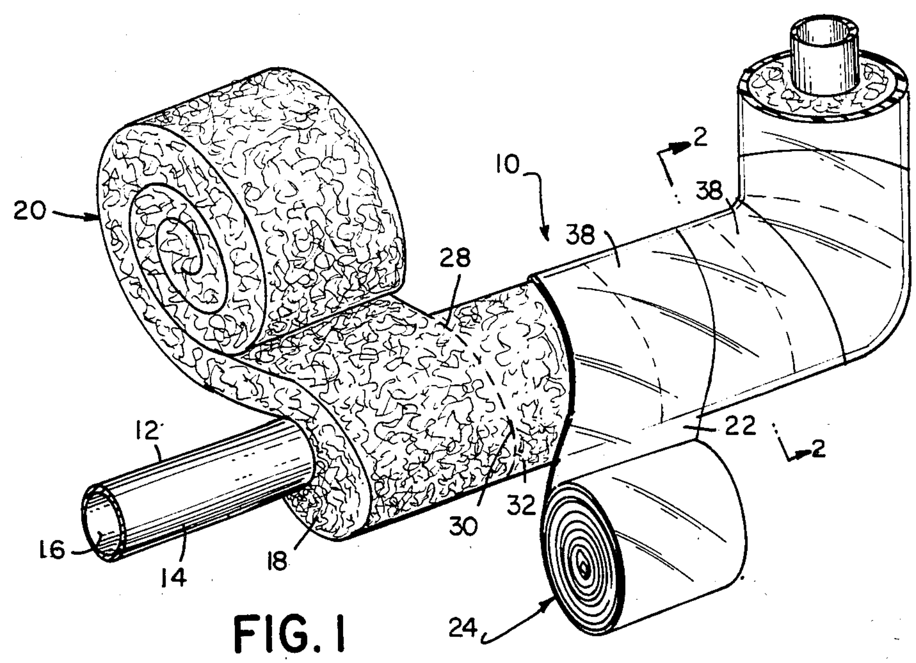
FIG. 1 is a perspective view of a section of pipe with an insulating system according to the invention in place thereon and in part illustrating the method of producing the insulating system thereon.
Figure 2:
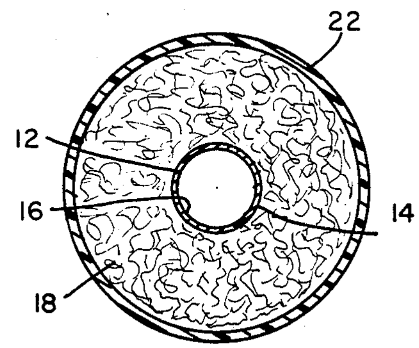
FIG. 2 is a cross sectional view of the insulating system of FIG. 1 taken along the lines 2—2 of FIG. 1 looking in the direction of the arrows.
Figure 3:
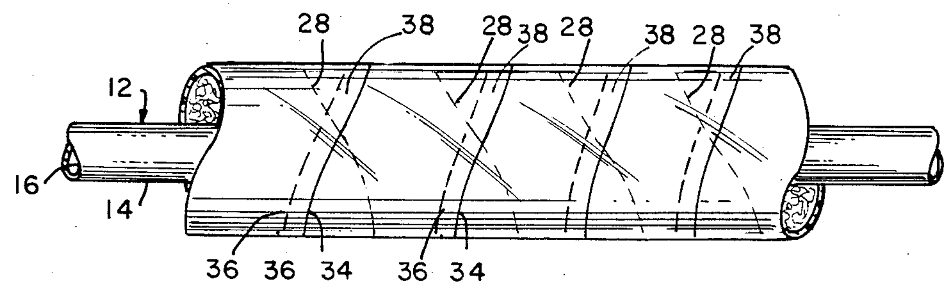
FIG. 3 is a side view of a section of pipe provided with and insulating system according to the present invention as applied by helical wrapping.

Referring now to the drawings and more particularly to FIGS. 1–3 there is shown one illustrative embodiment of the insulation system of the invention designated generally 10 assembled about a conduit 12. The conduit 12 may be formed of any suitable material such as, for example, metal, ceramic, or plastic material well known to those skilled in the art. For purposes of the illustrative embodiment of the invention the conduit 12 will be described as a metal conduit, such as, for example, copper pipe, for conveying hot or cold fluids such as water. The conduit 12 is tubular in form and has an outer surface 14 and an inner surface 16. It should be understood that the conduit pipe 12 is shown by way of illustration only and that different shapes, sizes and forms of materials to be insulated may be achieved by appropriate modification of the insulating system of the present invention.

Disposed about the outer surface 14 of conduit 12 is a thermal barrier layer of flexible insulating material 18. The insulating material 18 is formed of a compressible resilient material which can be prepared in thick mat or sheet form and which can be stored and dispensed from a roll 20 of the insulating material. The insulating material may be a material such as fiber glass, mineral wool, polyurethane, styrene, or the like.

Disposed about the thermal barrier layer 18 is a vapor barrier layer 22. The vapor barrier layer 22 is formed of a material which is thin and flexible and can be stored and dispensed from a roll 24 of the material. By the term vapor barrier it is understood to mean that the material 22 is substantially completely impervious to fluids such as water, water vapor and gases under the usual household environmental condition of temperature, pressure and humidity. An important feature of the vapor barrier material 22 is that it exhibits cohesion. By the term cohesion as used herein it is meant that the vapor barrier layer material have a sufficient cohesive force whereby when wrapped upon itself or when two of its surfaces are brought in contact the area of the surfaces so brought in contact will form a tight releasable seal. The cohesive seal thus formed is impervious to fluids such as water vapor, water and gases as is the material 22. Another feature of the cohesive force of the vapor barrier material is that it provides sufficient frictional force to resist lateral movement of one surface over another surface when two surfaces are brought into contact such when forming the releasable seal. One material found suitable for the vapor barrier layer 22 is formed of a polyethylene film produced by Union Carbide Corporation and sold under the trademark GLAD WRAP. Another suitable material is a plastic film produced by The Dow Chemical Company and sold under the trademark HANDI-WRAP.

The insulating system 10 may be supplied with indicia to permit easy identification of different pipeline services. For example, the vapor barrier layer may be color coded to identify such different pipeline services. For example, one color may be employed to identify cold water supply lines and another color to identify hot water supply lines. A wide selection of colors is very desirable in that it permits the use to color-identify the different pipelines and the like, so that distinction may be made between the lines and determination may be made for lines carrying different substances. Such color-coding is also helpful to distinguish between lines of different temperatures, different pressures or the like and to identify different parts of the same service such as the supply portion and the return lines. The color coding may take numerous forms such as a painted strip 26 (FIG. 4) well known to those skilled in the art.

Referring still to FIGS. 1–3 of the drawings the invention is described with respect to the method of providing an insulated pipe system. The thermal insulating material 18 is preferably applied from a roll and is preferably helically wound about the outer surface 14 of the conduit pipe 12 with adjacent edges 30 and 32 preferably juxta posed in contact to form a seam 28 (shown by the dotted line) defined by the contacting edges 30 and 32. It is to be understood that the edges 30 and 32 may be overlapped where the thickness of the insulating material 18 permits. After initiating the wrapping of the insulating material with several helical winds, then the winding of the outer vapor barrier layer of cohesive material 22 is begun. The initiating of the wrapping of the layer of cohesive material 22 at this point is important in the method of the invention since the cohesive layer 22 serves to hold the insulating material in place about the conduit pipe 12. As with the insulation 18 the layer of cohesive material is preferably applied from roll 24 and is preferably helically wrapped so that adjacent edge 34 overlaps edge 36 to form a sealed seam area 38 defined by the underlying edge 36 shown by the dotted line and the overlapped edge 34. The outer cohesive layer 22 is preferably counter wrapped so that its seam 34 does not coinside with the underlying seam 28 of the insulating material 18. It should be understood that the outer layer may be wrapped so as to "chase" the wrapping of the insulating material 18 so that the seam area 38 overlaps the seam 28 (not shown). In the wrapping of the outer layer of cohesive material 22 sufficient pressure is applied to partially compress the insulating layer 18 radially and circumfirentially. Such compressive forces mutually cooperate to exert an outward expansive force radially and circumfirentially on the outer layer of cohesive material 22 including the seam 38 to further strengthen the cohesive seal formed along the seam 38. Additionally, such resultant expansive forces increase the cohesive seal to maximize the fluid-tight seal area 38 between overlapping edges. It is to be understood that the amount of overlapping may be varied in area, depending on the strength needed to hold the insulating material 18 adjacent the conduit 12 and the economic consideration regarding the amount of cohesive material used. One advantage of the insulation system of the present invention with respect to the method of application is that once the application is started, the applicator can wrap the insulating layer 18 and the vapor barrier layer 22 simultaneously and, without the interruptions necessitated by the periodic application of adhesives, tapes, or ties as required by some prior art, hold the insulation system 10 on the conduit 12. Additionally, the cohesive material 22 does not have the disadvantages associated with the use of adhesives or tapes which may easily become impaired with dirt or dust.

Figure 4:
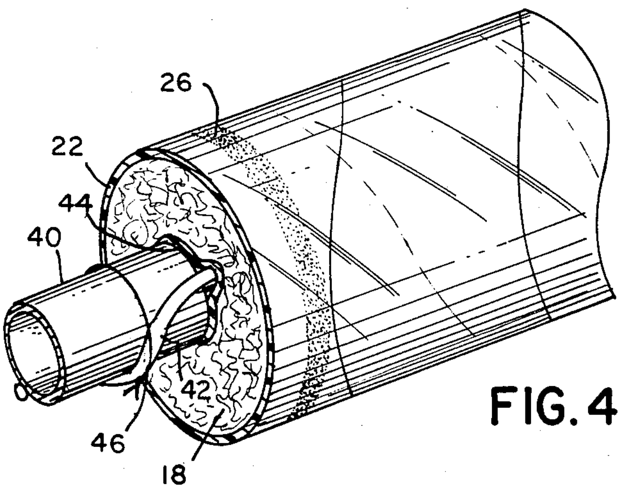
FIG. 4 is a fragmentary perspective view of an illustrative embodiment of the invention in assembled position about a conduit embraced by a heat tracer member.

Referring now more particularly to FIG. 4 there is shown one illustrative embodiment of the invention wherein the insulation system 10 is assembled about a conduit 40 of any suitable metal or plastic material. In this illustration the conduit 40 is embraced with a heat tracer 42. The heat tracer 42 may take the form of a heat tape, which is electrically heated or tubing which may convey steam or other heating medium. The heat tracer 42 is used to heat the conduit 40 under certain circumstances well known to those skilled in the art. In this embodiment the inner surface of the insulation material is provided with an inner layer of heat conducting and heat reflecting metal foil 44 such as aluminum foil to distribute the heat of the heat tracer to the conduit 40 and reduce heat loss. The heat tracer may be held in place about the conduit 40 in any suitable manner such as by tie strings 46 located at intervales along its length.

Figure 5:
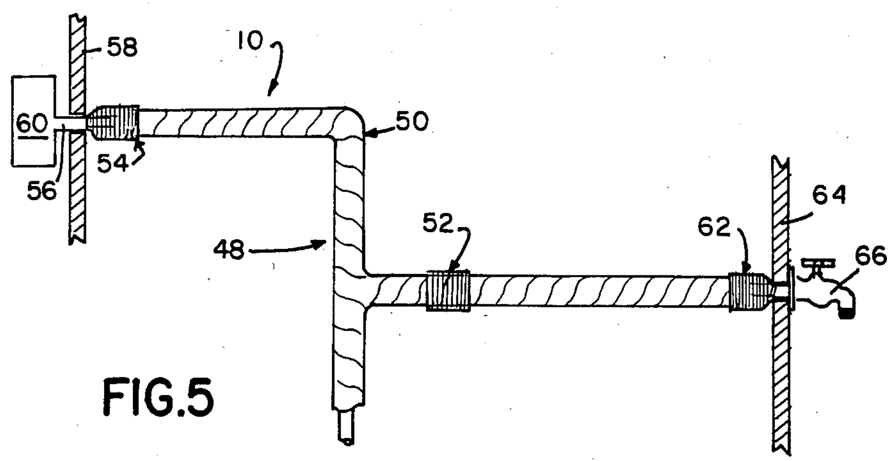
FIG. 5 is a perspective view or an embodiment of the insulating system of the present invention as applied to a section of conduit having a T-shaped joint and an elbow-shaped joint and further illustrating one method of terminating the insulating system.

Referring now to FIG. 5, there is shown, for illustrative purposes, the insulating system of the present invention as applied to a section of conduit having a T-shaped joint 48 and an elbowshaped joint 50. The method of applying the insulating system 10 to such joints is the same as described with respect to straight sections. It should be noted that there are no special requirements or application procedure for coupling one application section to the next section. In accordance with the invention, when the end of a roll of the insulating layer 18 is reached, the end of the layer of the completed section is butted or slightly overlapped with the beginning of the new roll and the wrapping procedure continued as described previously, and when the end of a roll of the vapor barrier layer 22 is reached, a beginning of a new roll is wrapped once or twice around the region to create a cohesive coupling and the wrapping procedure resumed as described previously. Such a coupling with additional wraps of the outer vapor barrier material 22 is illustrated at 52 of FIG. 5. In FIG. 5 there is further illustrated one method of terminating the insulation system 10. The insulation system 10 is preferably terminated by providing additional wraps of the outer cohesive vapor barrier layer 22 as illustrated at 54 where the conduit 56 penetrates the partition 58 from a source of fluid 60, and at 62 prior to entering the partition 64 and terminating at faucet 66.

Figure 6:
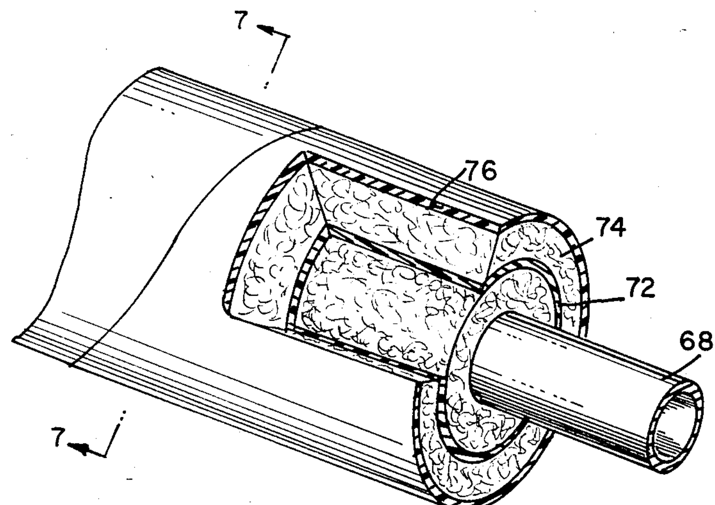
FIG. 6 is a fragmentary perspective view partially broken away to illustrate a modified embodiment of the invention.
Figure 7:
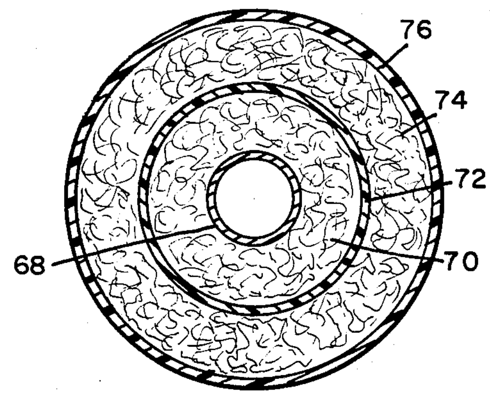
FIG. 7 is a cross sectional view taken along the lines 7—7 of FIG. 6 looking in the direction of the arrows.

Referring now to FIGS. 6 and 7, there is illustrated a modified embodiment of the invention. In this embodiment a double layer of the insulating system is applied to the conduit 68. As shown, there is applied a layer of insulating material 70 adjacent conduit 68 and a vapor barrier layer of cohesive material 72. Disposed about this first insulating system is a second insulating system comprising a layer of insulating material 74 and an outer vapor barrier layer of cohesive material 76. It will be appreciated that a plurality of insulating systems may be applied where the particular application requires increased protection.

Accordingly, the present invention provides a new and improved insulation system and method of insulating. The insulation system of the present invention provides for minimization of heat loss by conduction, convection and radiation from hot conduits while preventing dripping and sweating of cold conduits.

While the invention has been described with respect to preferred embodiments, it will be apparent to those skilled in the art that changes and modification may be made without departing from the scope of the invention herein involved in its broader aspects. Accordingly, it is intended that all matter contained in the above description, or shown in the accompanying drawing, shall be interpreted as illustrative and not in a limiting sense.

What is claimed is:

1. An insulating system for a tubular conduit for various fluids, said tubular conduit having an outer surface, the insulating system comprising;

an inner layer of compressible resilient thermal barrier material wrapped about the outer surface of said conduit;

an outer layer of fluid barrier cohesive material wrapped about said inner layer of thermal barrier material and having lateral edge portions in overlapped contact with one another; and a cohesive seal coextensive in length with said outer layer of fluid barrier material and being formed between said contacting overlapped edge portions of said outer layer, said edge portions being coherent to one another to form a cohesive seal therebetween, said outer layer being wrapped so as to partially compress both circumferentially and radially said resisient inner insulating layer whereby the resiliency of said inner layer cooperates to maximize said cohesive seal by pressing said contacting edges against one another thereby holding said thermal insulation system about said conduit;

said inner thermal barrier material being formed of a strip of said thermal barrier material having lateral edges and being helically wrapped so that adjacent edges abut to form a seam defined by said abutting edges; and said outer layer of cohesive material being wrapped about said thermal barrier material to minimize coincidence of said cohesive seal with said seam.

2. The insulating system of claim 1 further comprises a heat tracer element disposed about and in contact with the outer surface of said tubular conduit.

3. The insulating system of claim 1 further comprising indicia carried by said outer layer of cohesive material to identify said fluids.

4. The insulating system of claim 1 further comprising a heat reflective surface disposed upon the inner surface of said inner layer of thermal barrier material.

* * * * *